United States Patent [19]

Terase et al.

[11] Patent Number: 5,219,551
[45] Date of Patent: Jun. 15, 1993

[54] PROCESS FOR PREPARING HYDROGEN FLUORIDE

[75] Inventors: Kunihiko Terase; Sadao Hagita; Kouichi Yokoyama; Yasuhiro Sanada; Michiomi Nagase; Suekazu Hirata, all of Ichihara, Japan

[73] Assignee: Asahi Glass Company Ltd., Tokyo, Japan

[21] Appl. No.: 707,611

[22] Filed: May 30, 1991

[30] Foreign Application Priority Data

Jun. 1, 1990 [JP] Japan .................................. 2-141577

[51] Int. Cl.$^5$ .......................... C01B 7/19; C01B 33/14
[52] U.S. Cl. .................................... 423/485; 423/484; 423/335
[58] Field of Search .................. 423/484, 485, 335

[56] References Cited

U.S. PATENT DOCUMENTS

| | | | |
|---|---|---|---|
| 1,851,652 | 3/1932 | Söll | 423/484 |
| 2,735,245 | 7/1956 | Mitchell et al. | |
| 2,780,521 | 2/1957 | Butt | 423/163 |
| 3,907,978 | 9/1975 | Spreckelmeyer | 423/490 |
| 4,606,901 | 8/1986 | Chu et al. | 423/329 |
| 4,690,810 | 9/1987 | Breneman et al. | 423/339 |

FOREIGN PATENT DOCUMENTS 1304781 1/1973 United Kingdom .

OTHER PUBLICATIONS

F. Albert Cotton, "Advanced Inorganic Chemistry", 4th edition, pp. 383-385.
Susan Budavari, "The Merck Index", 11th edition, 1989, p. 654.
Gessner G. Hawley, "The Condensed Chemical Dictionary" 10th edition, pp. 919-920.
Ullmann's Encyclopedia of Industrial Chemistry 5th edition, vol. A11, pp. 310-312, 1988, Weinheim.
Soviet Inventions Illustrated Derwent Publications Ltd., Section Chemical, week 8505, abstract No. 85030550; & SU-A-1101403 (Irkut Alum Magn Ele) Jul. 7, 1984.
Soviet Inventions Illustrated Derwent Publications Ltd., Section Chemical, week 7504, abstract no. 7506983W; & SU-A-420565 ( S. I. Volfkovich et al.) Aug. 22, 1974.

Primary Examiner—Gary P. Straub
Assistant Examiner—Valerie Lund
Attorney, Agent, or Firm—Oblon, Spivak, McClelland, Maier & Neustadt

[57] ABSTRACT

A process for preparing hydrogen fluoride, which comprises (i) reacting calcium fluoride with sulfuric acid to produce a gypsum and a gas containing hydrogen fluoride, (ii) separating hydrogen fluoride from said gas containing hydrogen fluoride, (iii) absorbing said hydrogen fluoride-separated gas with water to obtain an aqueous solution containing hydrogen fluoride and silicofluoric acid, (iv) reacting calcium carbonate with said aqueous solution to obtain a suspension containing silicic acid and calcium fluoride, (v) adding an alkaline substance to said suspension to make pH at least 8, thereby stabilizing the silicic acid as a colloidal solution, (vi) separating a calcium fluoride solid and the colloidal solution of silicic acid from said suspension, and (vii) recycling the separated calcium fluoride as a starting calcium fluoride.

5 Claims, No Drawings

PROCESS FOR PREPARING HYDROGEN FLUORIDE

FIELD OF THE INVENTION

The present invention relates to a process for preparing hydrogen fluoride. Particularly, the present invention relates to a process for preparing hydrogen fluoride by efficiently converting a fluorine content in fluorite into hydrogen fluoride.

DISCUSSION OF THE BACKGROUND

Hydrogen fluoride is industrially produced by reacting fluorite with sulfuric acid in such a manner as shown in the following reaction formula. In this process, the hydrogen fluoride is recovered as a gas.

$$CaF_2 + H_2SO_4 \rightarrow 2HF + CaSO_4$$

In this step, a part of $SiO_2$ component contained as an impurity in the starting fluorite is reacted with the produced hydrogen fluoride to produce a silicon tetrafluoride gas in accordance with the following reaction formula.

$$SiO_2 + 4HF \rightarrow SiF_4 + 2H_2O$$

The hydrogen fluoride gas thus produced contains not only silicon tetrafluoride but also other impurities such as sulfur dioxide, sulfuric acid and dusts, and is therefore purified by washing with sulfuric acid and then subjecting to condensing, rectifying and stripping. The silicon tetrafluoride gas is separated as a low boiling material from hydrogen fluoride in the rectifying step, and is withdrawn from the top of a rectifying column. The silicon tetrafluoride thus withdrawn and an accompanying hydrogen fluoride are absorbed with water, and is reacted to produce a silicofluoric acid solution as shown in the following reaction formula.

$$SiF_4 + 2HF \rightarrow H_2SiF_6$$

The gas discharged from the top of the rectifying column is adjusted to contain hydrogen fluoride in an amount larger than the equivalent amount of the above reaction in order to prevent blocking by $SiO_2$ scale formed in a gas absorbing column. Thus, the composition of the aqueous solution having silicon tetrafluoride absorbed generally comprises from 30 to 50% by weight of $H_2SiF_6$ and from 5 to 20% by weight of HF.

This solution is neutralized with $Ca(OH)_2$, and is then filtered to obtain a waste containing a mixture of $CaF_2$ and $SiO_2$ or to be used as a starting material for producing $Na_2SiF_6$ by reacting with NaOH.

However, when the above-mentioned solution is neutralized with $Ca(OH)_2$, there is a problem that fluorine in this solution is disposed without being effectively used. Also, when the above-mentioned solution is reacted with NaOH to produce $Na_2SiF_6$, it is not preferable to convert the total amount of this material into $Na_2SiF_6$ since the demand for $Na_2SiF_6$ is limited.

SUMMARY OF THE INVENTION

Thus, an object of the present invention is to effectively use this waste material for the production of hydrogen fluoride by efficiently recovering a fluorine component from a mixture solution containing $H_2SiF_6$ and HF.

The present invention provides a process for preparing hydrogen fluoride, which comprises (i) reacting calcium fluoride with sulfuric acid to produce a gypsum and a gas containing hydrogen fluoride, (ii) separating hydrogen fluoride from said gas containing hydrogen fluoride, (iii) absorbing the resultant gas with water to obtain an aqueous solution containing hydrogen fluoride and silicofluoric acid, (iv) reacting calcium carbonate with said aqueous solution to obtain a suspension containing silicic acid and calcium fluoride, (v) adding an alkaline substance to said suspension to make pH at least 8, thereby stabilizing the silicic acid as a colloidal solution, (vi) separating a calcium fluoride solid from the colloidal solution of silicic acid in said suspension, and (vii) recycling the separated calcium fluoride as a starting calcium fluoride.

When calcium carbonate is added to a mixture solution containing silicofluoric acid and hydrogen fluoride, a solid calcium fluoride is formed in accordance with the following reaction formula.

$$H_2SiF_6 + 3CaCO_3 \rightarrow 3CaF_2 + SiO_2 + 3CO_2 + H_2O$$

$$2HF + CaCO_3 \rightarrow CaF_2 + CO_2 + H_2O$$

When this reaction is carried out in the pH range of from 1.5 to 4, the gelling time of the formed $SiO_2$ becomes relatively long, thereby enabling $SiO_2$ to be present in a colloidal state. If the pH is less than 1.5, an amount of unreacted fluorine becomes unfavourably large and the recovery rate of fluorine becomes lowered. On the contrary, if the pH is in the range of from 4 to a neutral zone, the gelling time of $Si_2$ becomes very short and a filter cloth is liable to be blocked when it is filtered by an ordinary filter. Also, according as the pH value becomes larger, the solubility of calcium carbonate becomes lowered and the reaction rate is unfavorably lowered. Thus, the pH value of the reaction solution is preferably from 2 to 3.

In the present invention, it is preferable to use a solution discharged from the step for producing hydrogen fluoride from fluorite as a mixture solution containing silicofluoric acid and hydrogen fluoride. Also, a solution discharged from the step for producing phosphoric acid from phosphorus ore can be used in the same manner as mentioned above. These solutions may be used in a mixture.

When reacting with calcium carbonate, the solution should preferably have a fluorine concentration of from 0.5 to 20% by weight. If the fluorine concentration of the solution exceeds 20% by weight, the concentration of the formed calcium fluoride slurry becomes too high that it can hardly be handled, and the $SiO_2$ concentration of the solution becomes too high and gelling of $SiO_2$ is accelerated so that a mixing amount of $SiO_2$ in $CaF_2$ to be recovered is unfavorably increased. On the contrary, if the fluorine concentration is less than 0.5% by weight, an amount of solution to be treated becomes so large that an apparatus used therefore must be designed uselessly large, and an amount of fluorine lost from the system together with the mother liquor becomes so large that the recovery rate of $CaF_2$ becomes unfavorably lowered. Thus, a more preferable fluorine concentration ranges from 1 to 7% by weight.

In the case of using a solution generally discharged from the step for producing hydrogen fluoride from fluorite, the solution is preferably diluted to from 3 to 50 times, more preferably from 5 to 20 times, when reacted with calcium carbonate.

A reaction apparatus for conducting this reaction is not specially limited, but includes ordinary apparatuses such as a complete mixing tank and a multi column continuous tank. A residence time in the reaction apparatus is suitably more than 10 minutes, more preferably more than 30 minutes. If the residence time is too short, an amount of unreacted calcium carbonate is unfavourably increased.

Calcium carbonate used in the reaction is not specially limited, but a slurry of about from 2 to 50% by weight is favorably used since it can be easily handled.

Calcium fluoride is separated from a slurry mixture comprising an $SiO_2$ colloid solution and a solid calcium fluoride obtained by the above reaction. Before separating calcium fluoride, it is preferable to add a flocculant effective in a low pH zone to the slurry, thereby settling and concentrating calcium fluoride.

In the above-mentioned slurry mixture having a pH value of from 2 to 3, $SiO_2$ is dispersed in a colloidal state, but is gelled as a lapse of time by the influence of free fluorine or unreacted remaining $CaCO_3$ contained in this mixture. The gelled product blocks a filter cloth of a filter or brings about scaling on the internal wall of a centrifugal separator, thus the separation becoming difficult. In order to make the separation easy, it is necessary to make the pH of the above-mentioned slurry mixture at least 8 by adding an alkaline substance. Under the pH condition of at least 8, a part of $SiO_2$ is dissolved to produce a stable colloidal solution which is easily separable. A more preferable pH range is from 8 to 12. When the pH value exceeds 12, the amount of the alkaline substance used increases and the purity of calcium fluoride recovered is unfavorably lowered.

The alkali substance used is not specially limited, but preferable examples include sodium hydroxide, calcium hydroxide and the like. Particularly, when calcium hydroxide is used, a crystalline calcium silicate solid is formed, which is useful as a filter aid to make the separation of calcium fluoride easy. The alkali substance may be added to the above-mentioned slurry mixture in various forms such as powder, solution or slurry.

Ordinary filtrating apparatuses such as a belt filter, a decanter and a centrifugal separator can be used as a separation apparatus.

As this result, a solid mixture containing from 90 to 95% by weight of $CaF_2$, from 2.5 to 3% by weight of $SiO_2$ and from 2 to 7% by weight of $CaCO_3$ can be obtained. This mixture can be favorably used as a starting material for producing hydrogen fluoride by supplying to a commercially available hydrogen fluoride-producing plant. In this case, this mixture may be supplied preferably in a mixture with an ore fluorite.

According to the present invention, the separation can be effectively carried out since the filtration is conducted after adjusting the pH of a reaction liquor at least 8 by adding an alkaline substance to, the reaction liquor containing calcium fluoride obtained by reacting calcium carbonate with a mixture solution containing silicofluoric acid and hydrogen fluoride.

The gelling action of $SiO_2$ is remarkably influenced by the pH condition. Generally, the gelling time becomes maximum in the vicinity of pH 2, and becomes minimum in the vicinity of pH 6-7. The dissolution reaction becomes active from the vicinity of pH 8-9. Thus, under the pH condition of not higher than 8, gelling occurs in a relatively shorter time. However, under the pH condition of at least 8, a part of $SiO_2$ is dissolved to be stabilized by the action of an alkaline substance, and $SiO_2$ is present in the sol form of polymerized silicic acid, which makes the separation by filtration easy.

Now, the present invention will be described in further detail with reference to example. However, it should be understood that the present invention is by no means restricted to such specific example.

EXAMPLE 270 kg/h of a solution containing 35.0% by weight of $H_2SiF_6$ and 11.9% by weight of HF and 2659 kg/h of diluting water were mixed in a line mixer, and the resultant mixture was charged in a complete mixing type reaction tank of an effective reaction volume of 6.4 m$^3$ equipped with a stirrer. To this reaction tank, was automatically supplied a 8% by weight slurry of calcium carbonate having a $CaCO_3$ purity of 99.3% by weight to adjust the pH value in the reaction tank 2.8. The amount of the calcium carbonate slurry thus supplied was 3311 kg/h.

From the reaction tank, a slurry containing calcium fluoride was withdrawn by overflowing, and 10 ppm of a high molecular flocculant (Kuriflock PN-161, manufactured by Kurita Kogyo Co., Ltd.) was added thereto. Thereafter, a solid component was concentrated by a thickener having a clean area of 5.3 m$^2$. The settling speed of the solid component was 12 m/h, and the solid component concentration of the slurry thus concentrated was 31.5% by weight.

The slurry thus obtained was supplied to a reactor of an effective volume of 1 m$^3$ equipped with a stirrer, and calcium hydroxide having a purity of 99.3% was added to the reaction tank to adjust the pH value in the tank 8.5. The amount of the calcium hydroxide added was 10 kg/h.

The concentrated slurry thus obtained was filtrated by a belt filter having a filter area of 4.5 m$^3$ to obtain 357 kg of a filter cake. The filtration speed was 70 kg dry calcium fluoride/m$^2$·h. The filtrated product thus obtained had the following composition.

| | |
|---|---|
| $CaF_2$ | 57.5% by weight |
| $SiO_2$ | 0.8% by weight |
| $CaCO_3$ | 1.4% by weight |
| $H_2O$ | 40.0% by weight |
| Others | 0.3% by weight |

The recovery rate of fluorine was 94.8%.

COMPARATIVE EXAMPLE

Calcium fluoride was recovered in the same manner as in the above example, except that calcium hydroxide was not added to the concentrated slurry. The filtration speed was 40 kg dry calcium fluoride/m$^2$·h. The filtrated product thus obtained had the following composition.

| | |
|---|---|
| $CaF_2$ | 56.6% by weight |
| $SiO_2$ | 1.7% by weight |
| $CaCO_3$ | 1.4% by weight |
| $H_2O$ | 40.0% by weight |
| Others | 0.3% by weight |

The recovery rate of fluorine was 93.4%.

According to the present invention, calcium fluoride can be efficiently recovered from a mixture solution containing silicofluoric acid and hydrogen fluoride. Hydrogen fluoride can be produced at a high yield from fluorite by recovering calcium fluoride from a solution discharged from the step of producing hydrogen fluoride from fluorite and recycling the recovered calcium fluoride to the original production step in accordance with the present invention. Thus, the fluorine component which was heretofore discharged outside from the system, can be reused as a starting material for producing hydrogen fluoride by reacting with $SiO_2$ to recover as $CaF_2$.

What is claimed is:

1. In a process for preparing hydrogen fluoride, which comprises:
   i) reacting calcium fluoride containing an $SiO_2$ impurity with sulfuric acid to produce $CaSO_4$ and a gas containing hydrogen fluoride,
   ii) separating hydrogen fluoride from said gas containing hydrogen fluoride,
   iii) absorbing the resultant gas with water to obtain an aqueous solution containing hydrogen fluoride and silicofluoric acid,
   iv) reacting calcium carbonate with said aqueous solution to obtain a suspension containing silicic acid and calcium fluoride,
   v) separating a calcium fluoride containing solid, and
   vi) recycling said separated calcium fluoride as a starting calcium fluoride;
   the improvement comprising treating the suspension of step iv) with an alkali substance to make a pH of from 8 to 12, thereby stabilizing said silicic acid as a colloidal solution so that in step (v) the calcium fluoride is separated from said colloidal solution.

2. The process for preparing hydrogen fluoride according to claim 1, wherein said alkaline substance is calcium hydroxide.

3. The process for preparing hydrogen fluoride according to claim 1, wherein said aqueous solution containing hydrogen fluoride and silicofluoric acid has a fluorine concentration of from 0.5 to 20% by weight.

4. The process for preparing hydrogen fluoride according to claim 1, wherein said aqueous solution containing hydrogen fluoride and silicofluoric acid is diluted to from 3 to 50 times, to provide a fluorine concentration of from 1 to 7% by weight and is then reacted with calcium carbonate.

5. In a process for preparing hydrogen fluoride, which comprises:
   i) reacting calcium fluoride containing an $SiO_2$ impurity with sulfuric acid to produce $CaSO_4$ and a gas containing hydrogen fluoride,
   ii) separating hydrogen fluoride from said gas containing hydrogen fluoride,
   iii) absorbing the resultant gas with water to obtain an aqueous solution containing hydrogen fluoride and silicofluoric acid,
   iv) reacting calcium carbonate with said aqueous solution to obtain a suspension containing silicic acid and calcium fluoride,
   v) separating a calcium fluoride containing solid, and
   vi) recycling said separated calcium fluoride as a starting calcium fluoride;
   the improvement comprising treating the suspension of step iv), at a pH from 1.5 to 4, with an alkaline substance to make a pH of from 8 to 12, thereby stabilizing said silicic acid as a colloidal solution so that in step (v) the calcium fluoride is separated from said colloidal solution.

* * * * *